(12) United States Patent
McCullough et al.

(10) Patent No.: US 10,507,347 B2
(45) Date of Patent: Dec. 17, 2019

(54) USE OF LEAD SMELTING SLAGS FOR THE STABILIZATION OF METAL IONS FROM SOLID OR LIQUID MEDIA

(71) Applicant: Redox Technology Group, LLC, Carmel, IN (US)

(72) Inventors: Thomas P. McCullough, Carmel, IN (US); Gary Joel Meyer, Indianapolis, IN (US)

(73) Assignee: Redox Technology Group, LLC, Carmel, IN (US)

( * ) Notice: Subject to any disclaimer, the term of this patent is extended or adjusted under 35 U.S.C. 154(b) by 322 days.

(21) Appl. No.: 15/708,428

(22) Filed: Sep. 19, 2017

(65) Prior Publication Data

US 2018/0078805 A1 Mar. 22, 2018

Related U.S. Application Data

(60) Provisional application No. 62/396,523, filed on Sep. 19, 2016.

(51) Int. Cl.
| | | |
|---|---|---|
| *A62D 3/37* | (2007.01) | |
| *B09B 3/00* | (2006.01) | |
| *A62D 101/43* | (2007.01) | |

(52) U.S. Cl.
CPC .............. *A62D 3/37* (2013.01); *B09B 3/0025* (2013.01); *A62D 2101/43* (2013.01)

(58) Field of Classification Search
CPC ..... A62D 3/37; A62D 2101/43; B09B 3/0025
USPC ....................................................... 588/319
See application file for complete search history.

(56) References Cited

U.S. PATENT DOCUMENTS

| | | |
|---|---|---|
| 3,740,331 A | 6/1973 | Anderson et al. |
| 4,102,784 A | 7/1978 | Schlauch |
| 4,422,943 A | 12/1983 | Fender et al. |
| 4,671,882 A | 6/1987 | Douglas et al. |
| 5,916,123 A | 6/1999 | Pal et al. |
| 6,153,108 A | 11/2000 | Klock et al. |
| 6,991,593 B2 | 1/2006 | Price et al. |

OTHER PUBLICATIONS

Boller Herbert, Blaha Herbert, "Zur Kenntnis des Natriumthioferrates(III)", Monatshefte fur Chemie 114, 1983, (pp. 145-154).
Lassin, et al., Estimated thermodynamic properties of $NaFeS_2$ and erdite ($NaFeS_2:2H^2O$), Applied Geochemistry, 2014 (45), (pp. 14-24).
W. Zhang et al., "A critical review on secondary lead recycling technology and its prospect", Renewable and Sustainable Energy Reviews 61, 2016, (pp. 108-122).

*Primary Examiner* — Edward M Johnson
(74) *Attorney, Agent, or Firm* — Brinks Gilson & Lione

(57) ABSTRACT

A method of treating, stabilizing, precipitating, or otherwise removing heavy metal ions contained in a contaminated media, which method includes: providing a sodium-iron-sulfide mineral or crystalline phase, either alone or in combination with a pH adjusting substance; contacting said contaminated media containing heavy metal ions with the sodium-iron-sulfide mineral or crystalline phase, either alone or in combination with a pH adjusting substance; and allowing the contaminated media containing the heavy metal ions to react with said sodium-iron-sulfide mineral or crystalline phase, either alone or in combination with a pH adjusting substance, such that the contaminated media containing heavy metal ions form single or mixed metal-sulfide precipitates or co-precipitates.

16 Claims, 1 Drawing Sheet

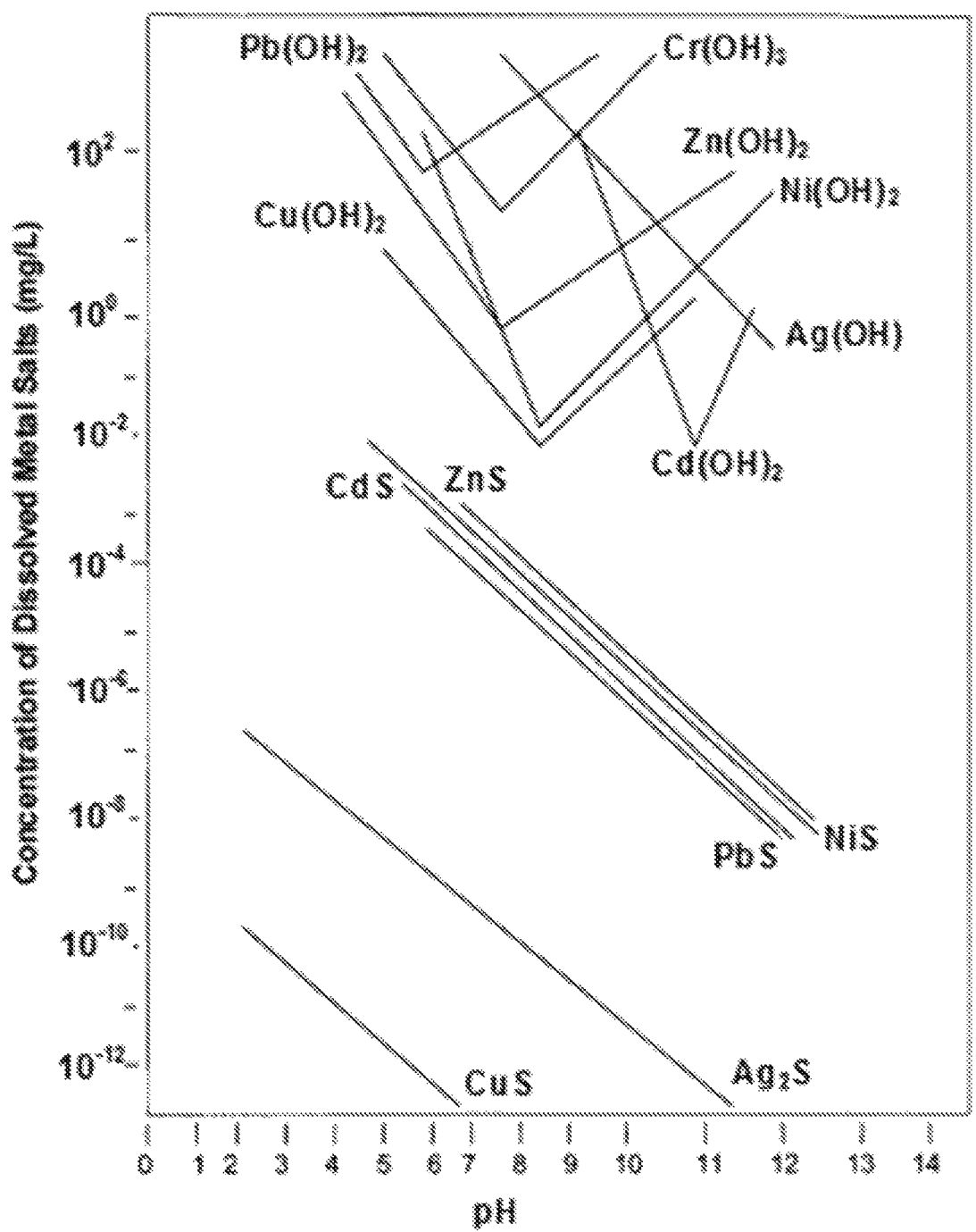

USE OF LEAD SMELTING SLAGS FOR THE STABILIZATION OF METAL IONS FROM SOLID OR LIQUID MEDIA

RELATED APPLICATION

This application is based on U.S. Provisional Application Ser. No. 62/396,523, filed Sep. 19, 2016 to which priority is claimed under 35 U.S.C. § 120 and of which the entire specification is hereby expressly incorporated by reference.

BACKGROUND

The present invention relates generally to the treatment of contaminated media, including solids, sludges, soils, suspensions, sediments, and liquids containing high concentrations of heavy metals by the incorporation or mixing of slags resulting from lead smelting processes into the contaminated media thereby lowering the level of total or leachable heavy metals from the contaminated media.

In the United States, solid wastes are classified as "non-hazardous" or "hazardous" by the United States Environmental Protection Agency (USEPA) pursuant to 40 CFR Part 261. Any solid waste can be defined as hazardous either because it is "listed" in 40 CFR Part 261 (Subpart D), or because it exhibits one or more of the characteristics of a hazardous waste as defined at 40 CFR Part 261 (Subpart C). These characteristics are: (1) ignitability, (2) corrosivity, (3) reactivity, and (4) toxicity. 40 CFR Part 261.24(a) contains a list of contaminants and their associated maximum allowable concentrations. If a particular contaminant in a contaminated media exceeds its maximum allowable concentration when subjected to a "Toxicity Characteristics Leaching Procedure" (TCLP) as specified at 40 CFR Part 261 Appendix 2, then contaminated solid waste is classified as "hazardous" and must be handled, transported, treated, and disposed as a hazardous solid waste.

During the TCLP test, contaminated media is mixed with either a dilute acetic acid in de-ionized water (TCLP fluid 2) or, depending of the pH of the contaminated material, in de-ionized water containing a sodium hydroxide buffer (TCLP fluid 1) to determine the concentration of leachable contaminants from a contaminated media if they were to be deposited in a landfill. The test was developed to simulate the potential reaction between the existing (acidic) environment in a landfill created by the combination of rainwater and the decomposition of organic matter existing in the landfill with the contaminated media.

The USEPA established the Land Disposal Restrictions (LDR) program to ensure hazardous waste are properly treated to destroy, stabilize, or immobilize hazardous chemical components before land disposal so as to not pose a threat to human health and the environment.

The LDR requires that hazardous solid waste are treated such that heavy metals do not leach from the solid waste at levels above the maximum allowable concentration prior to placement in a surface impoundment, waste pile, landfill or other land disposal unit as defined in 40 CFR.260.10.

As noted in "A critical review on secondary lead recycling technology and its prospect", W. Zhang et al., Renewable and Sustainable Energy Reviews 61 (2016), pages 108-122, lead is a versatile and strategically important industrial metal resource, and its production, recycling, application and consumption must be conducted such that any resulting lead emissions resulting from primary and secondary lead smelting activities are protective of the public health and environment.

There are two basic types of lead resources—primary lead resources such as lead ores in the form of minerals such as galena (PbS), cerussite ($PbCO_3$) and sulfuric acid galena ($PbSO_4$), and secondary lead resources mainly produced through the recycling of discarded lead-acid batteries. Even with the development of more efficient smelting furnaces and pretreatment equipment, the basic flow of lead-acid battery recycling operations has not significantly changed over the years.

In general, spent leads-acid batteries are first crushed in a hammer mill where the lead metal, polypropylene, lead grids and other solids are effectively separated from the spent lead paste. The resulting spent lead paste is composed of lead sulfate ($\approx$60% by weight), lead dioxide ($\approx$28%), lead oxide ($\approx$9%), and a small amount of metallic lead.

A common method of further refining spent lead paste is by an alkali-fusion process as described by Lassin, et al. in "Estimated thermodynamic properties of $NaFeS_2$ and erdite ($NaFeS_2:2H_2O$), Applied Geochemistry 2014 (45), pages 14-24. In general, lead is chemically reduced to its metallic form (between 327° C. (lead melting point) and 650° C. (lead boiling point) by eliminating the sulfates as sulfides and sulfidizing the chalcophile metals (e.g. Cu, Ag). The sodium alkali-fusion method uses alkalizing agents (e.g. $Na_2CO_3$, NaOH), desulfurizing agents (e.g. iron), and reducing agents (e.g. coke) to produce a hard (antimonial) lead which still may contain impurities (e.g. Cu, Sb, As, Sn, etc.). The hard lead is then turned into soft lead during a second stage where the traces of chalcophile metals are sulfidized, the Sn, As and Sb are oxidized, and the Ag and Bi in the Ag—Zn—Pb and Ca—Mg—Ag alloys that float on the molten lead are solubilized.

The sulfidic slag produced by the sodium alkali-fusion process however is primarily comprised of a particularly unstable sodium-iron-sulfide slag (sometimes referred to as sodium-iron-sulfide slag or sodium-iron-sulfide scoria), that if exposed to air, rapidly decomposes into a blackish powder. This sodium-iron-sulfide slag is primarily comprised of $NaFeS_2$, and due to the rapid topochemical reaction occurring in the presence of minimal amounts of water (atmospheric or otherwise), may reversibly or irreversibly convert to its hydrated mineral form—erdite ($NaFeS_2:2H_2O$).

A similar sodium-iron-sulfide material is also described in a paper entitled "Zur Kenntnis des Natriumthioferrates(III), Monatshefte fur Chemie 114, (1983), pages 145-154 authored by Herbert Boller Herbert Blaha. These authors describe a mixed-valence compound $Na_3Fe_2S_4$, which is oxidized and hydrated in air to $NaFeS_2:xH_2O$, where x$\approx$2. It was further shown by thermogravimetric analysis (TGA) that this hydrate loses the water reversibly between 80° C. and 140° C. The formation of $NaFeS_2:xH_2O$, where x$\approx$2 and $NaFeS_2$ were described as "topotactic", meaning there was a structural change of the crystalline solid by the addition (or loss) of water such that the final lattices of each are related by one or more crystallographically equivalent, orientational relationships.

A source of $Na_3Fe_2S_4$, $NaFeS_2$, or their oxidized and hydrated form ($NaFeS_2:xH_2O$), where x$\approx$2, are contained within the aforementioned sulfidic slag byproduct generated from secondary lead smelting operations.

Two common methods for treatment, stabilization, precipitation, or otherwise removal of dissolved heavy metal ions from contaminated media are hydroxide and sulfide precipitation.

In hydroxide precipitation, alkaline chemicals (e.g. lime or caustic) are used to adjust the pH of the contaminated media to a pH range where targeted heavy metal ions are least soluble and will precipitate as metal-hydroxides. Depending upon the presence of competing chemical species in the contaminated media, certain heavy metal-hydroxides (e.g. hydroxides of zinc, nickel, copper, lead, cadmium) are amphoteric compounds and exhibit minimum solubility in the pH range of 8 to 12. FIG. 1 demonstrates this characterization.

Two patents that illustrate the concept of treating a contaminated media by hydroxide precipitation are disclosed in U.S. Pat. No. 4,671,882 to Douglas, et al. and U.S. Pat. No. 5,916,123 to Pal, et al. Both disclose multi-step treatment methods to chemically convert metal-bearing solid and liquid waste materials to a non-leachable form by adjusting the pH of the contaminated media to form metal-hydroxides.

Again referring to FIG. 1, since sulfide ions have a greater affinity for the heavy metal ion than the hydroxide ion, sulfide precipitation of metal ions from solutions result in much less soluble metal-sulfide precipitates when compared to their metal-hydroxide equivalents.

Many patents disclose methods for removing heavy metal pollutant ions from solutions based on formation of metal-sulfide precipitates, including U.S. Pat. No. 3,740,331 to Anderson et al., whereby a sulfide ion and a metal ion that forms a metal-sulfide having a higher equilibrium sulfide ion concentration than the heavy metal pollutant to be removed are added to a liquid solution to be treated.

Further, since many of the heavy metal ion pollutants (e.g. zinc, nickel, tin, cobalt, lead, cadmium, silver, bismuth, copper, mercury) are less soluble than iron or manganese sulfides, various methods of producing iron or manganese sulfides directly in solutions containing heavy metal ion pollutants have been disclosed (U.S. Pat. No. 4,102,784 to Schlauch, U.S. Pat. No. 6,153,108 to Klock, et al.), while U.S. Pat. No. 4,422,943 to Fender, et al. discloses various methods to admix an aqueous slurry of FeS2 with a heavy metal bearing solution at a pH>7.

Other patents, for example U.S. Pat. No. 6,991,593 to Price, et. al disclose a two-step method to treat metal-bearing contaminated solid media by first adjusting the pH to a range from about 8.5 to 12.5 and then adding sufficient sulfide containing reducing reagent to the metal-bearing solid waste to reach an oxidation reduction potential less than about 50 mV in an extract from the metal-bearing waste.

These aforementioned patents, in particular those related to treatment of contaminated media containing a mixture of heavy metals, are based upon the concept that the mixture of heavy metals in the contaminated media will preferentially precipitate from the solution as metal-sulfides (or metal-hydroxides) based on the their respective solubility product (Ksp). A comparison of the solubility of various metal-sulfides are presented in Table 1 below:

TABLE 1

Solubility of various metal-sulfides at 25° C.(*)

| Formula | Mineral Name | log($K_{sp}$) |
|---|---|---|
| MnS | Alabandite | −0.003 |
| $NaFeS_2$ |  | −1.228 |
| FeS | $FeS_{(am)}$ | −2.990 |
| FeS | Mackinawite | −3.540 |
| FeS | Pyrrhotite | −3.679 |
| FeS | Troilite | −3.874 |
| $NaFeS_2:2H_2O$ | Erdite | −5.500 |
| AsS | Realgar | −7.800 |
| $Pd_4S_{(s)}$ |  | −8.837 |
| ZnS | Wurtzite | −9.189 |
| NiS | NiS(alpha) | −9.577 |
| ZnS | Sphalerite | −11.488 |
| CdS | Greenockite | −14.820 |
| PbS | Galena | −14.836 |
| $Cr_2S_{3(s)}$ |  | −16.704 |
| CuS | Covellite | −23.731 |
| HgS | Metacinnabar | −26.850 |
| $CoS_2$ | Cattierite | −27.183 |
| $SnS_2$ | Berndtite | −32.151 |
| $CuFeS_2$ | Chalcopyrite(alpha) | −33.669 |
| $Cu_2S$ | Chalcocite(alpha) | −34.755 |
| $Ag_2S$ | Acanthite(alpha) | −36.070 |
| HgS | Cinnabar(alpha) | −39.006 |
| PdS | Vysotskite | −44.806 |
| PtS | Cooperite | −60.932 |
| $FeSb_2S_4$ | Berthierite | −61.059 |
| $As_2S_3$ | Orpiment | −65.110 |
| FeAsS | Arsenopyrite | −92.129 |

(*)From the Bureau de Recherches Geologiques et Minieres (http://thermoddem.brgm.fr/) last accessed Aug. 8, 2016

Given the high volumes of sodium-iron-sulfide slag produced annually during the refining and smelting of spent lead-acid batteries, developing methods to beneficially and economically reuse these slags are of interest.

The use of sodium-iron-sulfide slag as a hazardous treatment reagent, either by itself, or in combination with other treatment reagents or protocols, provides a novel methodology for managing and treating contaminated media containing hazardous concentrations of a single or multiple heavy mental contaminant(s),

BRIEF SUMMARY

According to various features, characteristics and embodiments of the present invention which will become apparent as the description thereof proceeds, the present invention provides a method for the treatment, stabilization, precipitation, or otherwise removal of heavy metals from contaminated media by treatment with slags generated during lead smelting processes that are comprised of various sodium-iron-sulfide mineral (or crystalline) phases.

BRIEF DESCRIPTION OF THE DRAWINGS

The present invention will be described with reference to the attached drawings which are given as non-limiting examples only, in which:

FIG. 1 depicts the solubility of selected metal hydroxides and sulfides as a function of pH.

DETAILED DESCRIPTION OF THE DRAWINGS AND THE PRESENTLY PREFERRED EMBODIMENTS

The present invention provides a methods for the use of various sodium-iron-sulfide mineral (or crystalline) phases contained in slags generated during lead smelting processes for the treatment, stabilization, precipitation, or otherwise removal of heavy metal pollutants contained in contaminated media.

Herein, the term "contaminated media" means media, including but not limited to, solids, sludges, soils, suspensions, sediments, aquifers (particularly groundwater), industrial process or wastewaters that contain heavy metal contaminants or pollutants.

Slags obtained from lead smelting processes and in particular those slags obtained from processes using sodium alkali fusion are highly variable. This variability in the slag composition is the result of a combination of parameters, including but not limited to the lead paste feedstock composition, smelting furnace operation (e.g. temperature; type of alkali used), atmospheric exposure of the slag both during and after its formation, and environmental conditions during slag storage and aging. As a result, any particular sodium-iron-sulfide slag may contain, in addition to other contaminants, varying combinations of $Na_3Fe_2S_4$, $NaFeS_2$, and $NaFeS_2:xH_2O$ where $x \approx 2$.

The proposed disassociation reactions for $NaFeS_2$ and $NaFeS_2:2H_2O$ are:

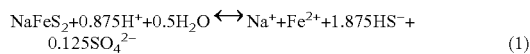

$$NaFeS_2 + 0.875H^+ + 0.5H_2O \longleftrightarrow Na^+ + Fe^{2+} + 1.875HS^- + 0.125SO_4^{2-} \quad (1)$$

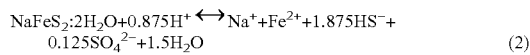

$$NaFeS_2:2H_2O + 0.875H^+ \longleftrightarrow Na^+ + Fe^{2+} + 1.875HS^- + 0.125SO_4^{2-} + 1.5H_2O \quad (2)$$

Based on these reactions and the solubility products (Ksp) referenced in Table 1, when a slag containing $NaFeS_2$ and/or $NaFeS_2:2H_2O$ is introduced to a contaminated media containing a number of heavy metal ions, the $NaFeS_2$ and/or $NaFeS_2:2H_2O$ (which have relatively high solubility products) will preferentially disassociate to form metal-sulfide precipitates with lower solubility products.

In addition to the sulfide ions ($S^{2-}$) generated during the preferential disassociation reactions of $NaFeS_2$ or $NaFeS_2:2H_2O$ to form single metal-sulfide precipitates with lower solubility products, these same disassociation reactions concurrently generate iron ions ($Fe^{2+}$) which, when combined with other heavy metals, may form mixed metal-sulfide precipitates (e.g. $FeAsS$, $CuFeS_2$, $FeSb_2S^4$) of lower solubility.

Careful consideration of the overall stoichiometry and mixture composition is required to both economically and effectively treat contaminated media since the precipitation of a lower solubility metal-sulfide may occur as the result of the disassociation of a more readily soluble metal-sulfide. In some cases, the lowering of the dissolved (or leachable) level of a hazardous metal pollutant in a contaminated media to below a regulatory goal may elevate the dissolved (or leachable) level of a different hazardous metal pollutant to a concentration greater than its respective regulatory goal.

For example, if $NiS$, is already present in the contaminated media (or in the sodium-iron-sulfide slag, it may disassociate in the presence of dissolved Pt in the contaminated media to be treated. Depending upon the stoichiometry and other factors (e.g. pH, temperature, oxidation-reduction potential), the formation of PtS may result in the lowering the dissolved Pt concentration to a desired regulatory goal, but increase the dissolved (or leachable) Ni concentration to unacceptable levels.

One method to mitigate this aforementioned quandary of "solving one problem while creating another" may be to design the overall treatment methodology such that multiple treatment methods or protocols are used simultaneously or sequentially.

An example where multiple treatment methods are used would be to treat a contaminated solid waste with a mixture of a base (e.g. CaO, $Ca(OH)_2$) and a sodium-iron-sulfide slag, either sequentially or in combination.

An example of a sequential treatment method would be to remove of a specific heavy metal pollutant from an industrial waste water by pH adjustment to promote metal-hydroxide precipitation followed by the use of a sodium-iron-sulfide slag to remove the remaining heavy metal pollutants in the effluent as metal-sulfide precipitates. The pH may be adjusted upward or downward by use of a variety of bases (e.g. CaO, $Ca(OH)_2$, NaOH) or acids (HCl, $H_2SO_4$, $H_3PO_4$) as required to achieve a particular treatment goal.

These types of treatment protocols, where multiple treatment methods are used simultaneously or sequentially, either "continuously" or by a "batch process" are typical in both hazardous solid waste treatment facilities and industrial wastewater treatment plants.

The present invention will be discussed with reference to the following non-limiting examples which are to be considered merely representative of the present invention and, thus, should not be considered as limiting.

Table 2 summarizes below various treatment of two untreated electric arc furnace dust waste streams (EAF #1; EAF #2) and a third untreated dust stream from an argon oxygen decarburization (AOD) process at a stainless steel facility. Each waste stream has exceedances of maximum LDR concentration for various combinations of cadmium, chromium, lead, and zinc. (e.g. Samples #1, #2, and #27).

TABLE 2

Treatment of EAF Dust

| Sample No. | Waste ID | NaFeS % wt | TCLP pH | ORP (mv) | Maxmum LDR Leachable Concentration (mg/L) |  |  |  |  |  |  |  |
|---|---|---|---|---|---|---|---|---|---|---|---|---|
|  |  |  |  |  | As | Cd | Cr | Ni | Pb | Sb | Se | Zn |
| EAF and AOD Controls |
|  |  |  |  |  | 5.0 | 0.11 | 0.60 | 11 | 0.75 | 1.15 | 5.7 | 4.3 |
| 1 | EAF #1 |  | 5.78 | +168.8 | 0.009 | 1.585 | 1.043 | 8.911 | 0.076 | 0.017 | 0.191 | 101.58 |
| 2 | EAF #2 |  | 7.13 | +60.6 | 0.030 | 0.050 | 0.002 | 4.472 | 0.623 | 0.432 | 0.014 | 34.22 |
| 27 | AOD |  | 12.66 | −161.2 | 0.011 | ND | 11.21 | ND | 8.584 | 0.130 | 0.018 | 1.864 |
| EAF + 20% AOD (wt/wt) |
| 11 | EAF #1 |  | 11.09 | −100.1 | 0.010 | 0.001 | 0.835 | 0.014 | 0.075 | 0.025 | 0.114 | 0.279 |
| 12 | EAF #2 |  | 11.55 | −105.5 | 0.016 | ND | 0.844 | 0.044 | 2.872 | 0.024 | 0.009 | 0.925 |
| 10% LIME (wt/wt) |
| 31 | EAF #1 |  | 10.81 | −55 | 0.004 | ND | 0.114 | 0.020 | 0.021 | 0.012 | 0.125 | 0.089 |
| 32 | EAF #2 |  | 11.88 | −87 | 0.037 | ND | 0.019 | 0.035 | 5.816 | 0.035 | ND | 0.664 |
| 5% (Na—Fe—S), (wt/wt) |

TABLE 2-continued

Treatment of EAF Dust

| Sample No. | Waste ID | NaFeS % wt | TCLP pH | ORP (mv) | As | Cd | Cr | Ni | Pb | Sb | Se | Zn |
|---|---|---|---|---|---|---|---|---|---|---|---|---|
| 29 | EAF #1 | 5% | 6.03 | −157.7 | ND | 0.008 | 0.222 | 7.119 | 0.039 | 0.040 | 0.090 | 24.545 |
| 30 | EAF #2 | 5% | 7.62 | −283.2 | 0.016 | ND | 0.002 | 0.441 | 0.017 | 0.358 | 0.003 | 0.197 |
| 28 | AOD | 5% | 12.62 | −528.2 | 0.006 | ND | 0.004 | ND | 0.008 | ND | ND | 0.045 |
| 10% LIME + (Na—Fe—S) | | | | | | | | | | | | |
| 3 | EAF #1 | 5% | 11.67 | −130.7 | 0.007 | ND | 0.004 | 0.023 | 0.007 | 0.008 | 0.140 | 0.069 |
| 4 | EAF #1 | 10% | 11.92 | −259.7 | — | ND | 0.009 | 0.034 | ND | ND | 0.129 | — |
| 5 | EAF #2 | 5% | 12.41 | −280.8 | 0.014 | ND | 0.008 | 0.039 | 0.006 | 0.001 | 0.004 | 0.068 |
| 6 | EAF #2 | 10% | 12.38 | −461.1 | 0.038 | ND | 0.007 | 0.016 | 0.004 | 0.001 | 0.023 | 0.088 |
| 20% AOD + (Na—Fe—S) | | | | | | | | | | | | |
| Slag #28 | EAF #1 | 5% | 11.41 | −177.3 | 0.009 | ND | 0.014 | 0.030 | 0.006 | ND | 0.094 | 0.074 |
| Slag #28 | EAF #1 | 10% | 11.27 | −184.2 | 0.001 | ND | 0.003 | 0.011 | 0.005 | ND | 0.088 | 0.055 |
| Slag #28 | EAF #2 | 5% | 11.91 | −180.6 | 0.016 | ND | 0.003 | 0.026 | 0.005 | 0.015 | 0.003 | 0.048 |
| Slag #28 | EAF #2 | 10% | 11.91 | −265.1 | 0.016 | ND | 0.003 | 0.017 | 0.007 | ND | 0.010 | 0.028 |
| Slag #60 | EAF #1 | 5% | 11.20 | −167.0 | 0.007 | ND | 0.004 | 0.014 | 0.008 | ND | 0.112 | 0.036 |
| Slag #60 | EAF #2 | 5% | 11.62 | −211.0 | 0.010 | ND | 0.002 | 0.037 | ND | 0.021 | 0.016 | 0.038 |
| Slag #75 | EAF #1 | 5% | 11.14 | −270.1 | ND | ND | 0.002 | 0.008 | 0.005 | ND | 0.097 | 0.034 |
| Slag #75 | EAF #2 | 5% | 11.69 | −272.9 | 0.009 | ND | 0.002 | 0.030 | ND | 0.027 | 0.008 | 0.032 |

Again in referring to Table 2, as an alternative to virgin lime addition to raise the pH, a 20% (wt/wt) addition of AOD was mixed with EAF #1 or EAF #2 to raise the pH to 10.81 and 11.88, respectively. Although EAF #1 was successfully treated for cadmium and zinc, the treatment protocol was unsuccessful in meeting the maximum LDR concentration for chromium (Sample #11). Further, the treatment of EAF #2 resulted in successfully treating for zinc, however LDR concentration exceedances for chromium and lead remained (Sample #12).

Again in referring to Table 2, a 10% (wt/wt) lime addition to EAF #1 to promote metal-hydroxide precipitation was successful in achieving compliance for cadmium, chrome, and zinc (Sample #31). The same 10% (wt/wt) lime addition treatment to EAF #2 resulted in the successful treatment of zinc however simultaneously created an LDR concentration exceedance for lead (Sample #32).

Again in referring to Table 2, when either EAF #1, EAF #2, or AOD was treated with a 5% (wt/wt) addition of a secondary lead smelting slag containing a sodium-iron-sulfur mineral or crystalline phase as described in the present invention, treatment of EAF #2 and the AOD was successful (Samples #30 and #28), however treatment of EAF #1 was still unsuccessful in meeting the maximum LDR concentration for zinc (Sample #29).

Again in referring to Table 2, various combinations of 10% lime addition plus, 5% or 10% (wt/wt) addition of a secondary lead smelting slag containing a sodium-iron-sulfur mineral or crystalline phase as described in the present invention were all successful in treating EAF #1 and EAF #2 (Samples #3 through #6).

The remaining data in Table 2 represents successful compliance for maximum LDR concentration for all metals in two electric arc furnace dusts (EAF #1 or EAF #2) by a mixture of 20% (wt/wt) AOD, plus a 5% or 10% (wt/wt) addition of various secondary lead smelting slags (Slag #28, Slag #60, and Slag #75) each containing a sodium-iron-sulfur mineral or crystalline phase as described in the present invention.

Table 3 below summarizes various treatment protocols tested on a chromite ore processing residue. Chromite ore processing residue (COPR) is a waste byproduct of chromate production that contains high levels of total chromium and hexavalent chromium (Cr[VI]). In the COPR samples tested here, the hexavalent chromium concentrations averaged between 5,660 and 7,220 mg/kg with TCLP chromium averaging 320 to 349 mg/L.

TABLE 3

Treatment of Chromite Ore Processing Residue (COPR)

| Treatment | TCLP Cr (mg/L) |
|---|---|
| LDR Maximum Concentration | 0.60 |
| COPR - untreated(*) | 320 to 348.8 |
| COPR - treated with: | |
| 14% Lime | 91.37 |
| 14% Lime + 2.5% NaHS | 27.696 |
| 14% Lime + 5% NaHS | 4.301 |
| 14% Lime + 5% Na—Fe—S Slag | 0.896 |
| 14% Lime + 10% Na—Fe—S Slag | 0.010 |
| 14% Lime + 15% Na—Fe—S Slag | 0.057 |
| 15% Na—Fe—S Slag | 0.034 |

(*)The untreated COPR sample had a hexavalent chromium concentration of 5,660 to 7,220 mg/kg.

The results summarized in Table 3 indicate that treatment of the COPR with 14% lime addition (wt/wt), 14% lime addition+NaHS, or a 14% lime addition+5% of a secondary lead smelting slag containing a sodium-iron-sulfur mineral or crystalline phase as described in the present invention were not able to lower the TCLP chromium concentration below the maximum LDR chromium limit of 0.60 mg/L.

Although a 14% lime addition plus either NaHS or 5% secondary lead smelting slag was not apparently successful at the above mentioned dose rates, either alone or in combination, treatment of the same COPR sample with a 10% or 15% by weight secondary lead smelting slag containing a sodium-iron-sulfur mineral or crystalline phase as described in the present invention (with or without a 14% lime addition) were successful in lowering the TCLP chromium concentration below the maximum LDR chromium limit of 0.60 mg/L.

The results of these tests demonstrate that the use a secondary lead smelting slag containing a sodium-ironsulfur mineral or crystalline phase as described in the present invention provides for the stabilization of heavy metal pollutants from contaminated media.

The simultaneous re-use one industrial waste (slag) to treat another contaminated media as described in the present invention is also economical (use of waste byproducts compared to virgin treatment chemicals) and overcomes the actual or potential safety and handling drawbacks of other known sulfide treatment technologies (use of NaHS).

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method of treating, stabilizing, precipitating, or otherwise removing heavy metal ions contained in a contaminated media, which method comprises the steps of:
   providing a sodium-iron-sulfide mineral or crystalline phase, either alone or in combination with a pH adjusting substance;
   contacting said contaminated media containing heavy metal ions with the sodium-iron-sulfide mineral or crystalline phase, either alone or in combination with a pH adjusting substance; and
   allowing the contaminated media containing the heavy metal ions to react with said sodium-iron-sulfide mineral or crystalline phase, either alone or in combination with a pH adjusting substance, such that the contaminated media containing heavy metal ions form single or mixed metal-sulfide precipitates or co-precipitates.

2. The method of treating stabilizing, precipitating, or otherwise removing heavy metal ions contained in a contaminated media according to claim 1, wherein the sodium-iron-sulfide mineral or crystalline phase is comprised of $Na_3Fe_2S_4$, $NaFeS_2$, or $NaFeS_2$:xH2O, where x≈2.

3. The method of treating stabilizing, precipitating, or otherwise removing heavy metal ions contained in a contaminated media according to claim 2, wherein the $Na_3Fe_2S_4$, $NaFeS_2$, or $NaFeS_2$:$xH_2O$, where x≈2 is obtained from a slag or industrial byproduct.

4. The method of treating, stabilizing, precipitating, or otherwise removing heavy metal ions contained in a contaminated media according to claim 3, wherein the $Na_3Fe_2S_4$, $NaFeS_2$, or $NaFeS_2$:xH2O, where x≈2 is obtained from a slag or industrial byproduct generated during lead smelting.

5. The method of treating stabilizing, precipitating, or otherwise removing heavy metal ions contained in a contaminated media according to claim 1, wherein the contaminated media containing heavy metal ions contains at least one heavy metal from a group consisting of antimony, arsenic, cadmium, chromium, cobalt, copper, lead, manganese, mercury, nickel, palladium, platinum, selenium, silver, thallium, tin, or zinc.

6. The method of claim 1, wherein the pH adjusting substance comprises an acid.

7. The method of claim 1, wherein the pH adjusting substance comprises a base.

8. The method of claim 1, wherein the contaminated media is contacted with the sodium-iron-sulfide mineral or crystalline phase either simultaneously with of after the contaminated media is contacted with a pH adjusting substance.

9. A method of treating, stabilizing, precipitating, or otherwise removing heavy metal ions contained in a solid, sludge, soil, suspension, or sediment, which method comprises the steps of:
   providing a sodium-iron-sulfide mineral or crystalline phase, either alone or in combination with a pH adjusting substance;
   contacting said solid, sludge, soil, suspension, or sediment containing heavy metals with the sodium-iron-sulfide mineral or crystalline phase, either alone or in combination with a pH adjusting substance; and
   allowing the solid, sludge, soil, suspension, or sediment containing the heavy metal ions to react with said sodium-iron-sulfide mineral or crystalline phase, either alone or in combination with a pH adjusting substance, such that the solid, sludge, soil, suspension, or sediment containing heavy metal ions form single or mixed metal-sulfide precipitates or co-precipitates and render the thus treated solid, sludge, soil, suspension, or sediment containing heavy metals non-hazardous.

10. The method of treating, stabilizing, precipitating, or otherwise removing heavy metal ions contained in a solid, sludge, soil, suspension, or sediment according to claim 9, wherein the sodium-iron-sulfide mineral or crystalline phase is comprised of $Na_3Fe_2S_4$, $NaFeS_2$, or $NaFeS_2$:xH2O, where x≈2.

11. The method of stabilizing, precipitating, or otherwise removing heavy metal ions contained in a solid, sludge, soil, suspension, or sediment according to claim 10, wherein the $Na_3Fe_2S_4$, $NaFeS_2$, or $NaFeS_2$:$xH_2O$, where x≈2 is obtained from a slag or industrial byproduct.

12. The method of stabilizing, precipitating, or otherwise removing heavy metal ions contained in a solid, sludge, soil, suspension, or sediment according to claim 11, wherein the $Na_3Fe_2S_4$, $NaFeS_2$, or $NaFeS_2$:$xH_2O$, where x≈2 is obtained from a slag or industrial byproduct generated during lead smelting.

13. The method of treating, stabilizing, precipitating, or otherwise removing heavy metals contained in a solid, sludge, soil, suspension, or sediment according to claim 9, wherein the solid, sludge, soil, suspension, or sediment containing heavy metal ions contains at least one heavy metal from a group consisting of antimony, arsenic, cadmium, chromium, cobalt, copper, lead, manganese, mercury, nickel, palladium, platinum, selenium, silver, thallium, tin, or zinc.

14. The method of claim 9, wherein the pH adjusting substance comprises an acid.

15. The method of claim 9, wherein the pH adjusting substance comprises a base.

16. The method of claim 9, wherein the solid, sludge, soil, suspension, or sediment is contacted with the sodium-iron-sulfide mineral or crystalline phase either simultaneously with of after the solid, sludge, soil, suspension, or sediment is contacted with a pH adjusting substance.

* * * * *